US006587076B2

(12) United States Patent
Fujii et al.

(10) Patent No.: US 6,587,076 B2
(45) Date of Patent: Jul. 1, 2003

(54) BEAM SCANNING ANTENNA

(75) Inventors: Mikio Fujii, Kyoto (JP); Takeshi Takenoshita, Kyoto (JP)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 10/026,869

(22) Filed: Dec. 20, 2001

(65) Prior Publication Data

US 2002/0080065 A1 Jun. 27, 2002

(30) Foreign Application Priority Data

Dec. 22, 2000 (JP) ....................................... 2000-390680

(51) Int. Cl.[7] ............................ H01Q 3/26; H01Q 3/00; G02F 1/13

(52) U.S. Cl. ........................ 342/372; 343/757; 349/202

(58) Field of Search ......................... 342/372; 343/757; 349/202

(56) References Cited

U.S. PATENT DOCUMENTS 5,151,814 A * 9/1992 Grinberg et al. ............ 349/202
5,194,972 A 3/1993 Lim et al.
5,253,033 A * 10/1993 Lipchak et al. ............. 349/202
6,016,122 A * 1/2000 Malone et al. .............. 342/372
2002/0070896 A1 * 6/2002 Phelan ........................ 342/372

FOREIGN PATENT DOCUMENTS

JP 3-6683 1/1991
JP 4-234202 8/1992

* cited by examiner

*Primary Examiner*—Thomas H. Tarcza
*Assistant Examiner*—F H Mull
(74) *Attorney, Agent, or Firm*—Hogan & Hartson, LLP

(57) ABSTRACT

A beam scanning antenna has the following structure: A primary radiator and a flat wave collector are disposed between metal plates, and input and output portions are provided on one of the metal plates. In the wave collector, a plurality of strip-shaped electrodes substantially parallel to one another in the direction of travel of electromagnetic waves is disposed on one principal surface of a substrate made of a material whose dielectric constant can be changed by an electrostatic field, and on the other principal surface, an counter electrode being strip-shaped or formed on a substantially entire area of the surface is disposed so as to be opposed to the strip-shaped electrodes.

10 Claims, 3 Drawing Sheets

BEAM SCANNING ANTENNA

BACKGROUND OF THE INVENTION

1. Field of the Invention

The present invention relates to an antenna used in millimeter waves or microwaves, and more particularly, to abeam scanning antenna in which the direction of a beam of radiated or absorbed electromagnetic waves can be changed by changing the phase of the electromagnetic waves.

2. Description of the Related Art

In millimeter waves or microwaves applied radar technology is well-known such type radars that in order to accurately recognize the position of an object in a wide target area, the beam of electromagnetic waves is focused and thinned, while being scanned at the same time.

On the other hand, in recent years, a millimeter wave radar has been about to be mounted on cars so that obstacles are detected while cars are running. The millimeter wave radar is to be mounted on cars, and accordingly is required to be small in size, light in weight, high in reliability and low in cost.

Beam scanning antenna of such types that switching among a plurality of antennas is carried out by a PIN diode or the like and that the antenna itself is swung are put into actual use as beam scanning antenna for car radars.

Moreover, a beam scanning antenna using a phase shifter is used in many radars although not commercialized for car radars at the present time. In the beam scanning antenna, the direction of a beam radiated from an array antenna or inputted to the array antenna is changed by accurately changing the phase of a signal fed to each element of the array antenna by use of a phase shifter such as a latched ferrite.

The conventional beam scanning antennas, however, have the following problems:

First, high reliability as a radar to be mounted to a vibrating apparatus such as a car radar can hardly be ensured in the beam scanning antenna, which swings itself, because of its mechanical driving portion, although the beam scanning antenna is easily manufactured because of its simple structure and the beam direction can finely be switched. Further, reduction in size cannot be achieved because of space for swinging the antenna.

A beam scanning antenna of such a type that switching among a plurality of antennas is carried out has an advantage of high reliability because no mechanical control is used. This type beam scanning antenna, however, has a problem of low availability of each antenna because only part of the plurality of antenna are operated at a moment, and a problem that the reduction in size of the entirety of the beam scanning antenna is hardly achieved because of necessity of the plurality of antennas. Further, since an antenna aperture of a predetermined area or more is required of the beam scanning antenna of this type irrespective of the configuration and material of the antenna elements to obtain a desired antenna gain or beam diameter, it is necessary to provide the plurality of fixed antennas with the same property to obtain the desired antenna gain or beam diameter. Consequently, it cannot be helped that the overall antenna area is large. At the same time, a switch for high frequency applications suffers large insertion loss and is difficult to operate with a high degree of efficiency. Moreover, in order to finely switch the beam direction, the number of necessary antennas increases with the result that the overall area of the antennas increases and the antenna gain decreases with increases in number of switches. Consequently, it is practically impossible to provide a beam scanning antenna in which the beam direction can be finely switched.

The beam scanning antenna using a phase shifter has a limitation of use because the phase shifter is normally large in size and expensive.

As described above, presently, no beam scanning antenna meets the requirements of being small in size, light in weight, high in reliability and low in cost although the beam scanning antenna is a technology expected to be increasingly used, particularly, for car radars in the future.

SUMMARY OF THE INVENTION

The invention is made in view of the above-mentioned problems of the related art, and an object thereof is to provide a small-size, lightweight, high-reliability and low-cost beam scanning antenna having no mechanical driving portion and capable of scanning of an electromagnetic wave beam by only electric signals.

The invention relates to a beam scanning antenna comprising two conductor plates disposed parallel to each other; a primary radiator for transmitting and receiving electromagnetic waves; and a wave collector for electromagnetic waves, shaped like a flat plate, the primary radiator and the wave collector being disposed between the two conductive plates, a plurality of input and output portions for joining the electromagnetic waves between the wave collector and the input and output portions being disposed on one of the conductive plates, the wave collector including a substrate formed of a material whose dielectric constant can be changed by an electrostatic field, a plurality of strip-shaped electrodes disposed on one principal surface of the substrate so as to be substantially parallel to one another in a direction of travel of the electromagnetic waves, and a counter electrode formed on the other principal surface of the substrate, the counter electrode extending on a substantial entirety of the other principal surface or being separated into strips so as to be opposite to the plurality of strip-shaped electrodes formed on the one principal surface, > wherein the electrostatic field is applied between the electrodes formed on the one principal surface and the counter electrode formed on the other principal surface to partially change a dielectric constant of the wave collector in a direction perpendicular to the direction of travel of the electromagnetic waves, whereby a direction of a beam of the electromagnetic waves radiated or absorbed through the input and output portions is made variable.

Moreover, in the invention, it is preferable that within a plane perpendicular to the direction of travel of the electromagnetic waves in the substrate of the wave collector, the wave collector has a dielectric constant substantially unchanged in a direction perpendicular to a shorter side of the strip-shaped electrodes formed on the one principal surface, and has in a direction parallel to the shorter side, refractive indices for the electromagnetic waves which are distributed as a quadratic function of distance with a predetermined point as a peak.

Moreover, in the invention, it is preferable that the dielectric constant of the material of the substrate whose dielectric constant can be changed by the electrostatic field is changed by 20% or more by application of the electrostatic field, and a dielectric loss thereof is 1% or less.

Moreover, in the invention, it is preferable that the material of the substrate is made of a ferroelectric of (Ba, $Sr)TiO_3$, $BaTiO_3$ or $SrTiO_3$, or a liquid crystal material such as nematic liquid crystal, cholesteric liquid crystal or smectic liquid crystal, or a liquid crystal polymer.

Moreover, in the invention, it is preferable that within a plane perpendicular to the direction of travel of the electromagnetic waves in the substrate of the wave collector, the wave collector has a highest dielectric constant at a center of the substrate in the direction parallel to a shorter side of the strip-shaped electrodes formed on the one principal surface and has dielectric constants which are reduced so that square roots of the dielectric constants decrease as a quadratic function of distance toward a periphery of the substrate, whereby the refractive indices for the electromagnetic waves are decreased as the quadratic function of distance with the center of the substrate as a peak.

The invention relates to a wave collector comprising: a substrate made of a material whose dielectric constant can be changed by an electrostatic field, in which substrate electromagnetic waves travel in a predetermined direction of travel; strip-shaped electrodes disposed on one principal surface of the substrate so as to be substantially parallel to one another in the direction of travel of the electromagnetic waves; and a counter electrode formed on the other principal surface of the substrate, the counter electrode extending on a substantial entirety of the other principal surface or being separated into strips so as to be opposite to the plurality of strip-shaped electrodes formed on the one principal surface, wherein a dielectric constant of the wave collector in a direction perpendicular to the direction of travel is partially changed by applying an electrostatic field between the electrodes formed on the one principal surface and the counter electrode formed on the other principal surface.

According to the invention, a beam scanning antenna comprises two conductor plates disposed parallel to each other; a primary radiator for transmitting and receiving electromagnetic waves; and a wave collector for electromagnetic waves, shaped like a flat plate, the primary radiator and the wave collector being disposed between the two conductive plates, a plurality of input and output portions for joining the electromagnetic waves between the wave collector and the input and output portions being disposed on one of the conductive plates, the wave collector including a substrate formed of a material whose dielectric constant can be changed by an electrostatic field, a plurality of strip-shaped electrodes disposed on one principal surface of the substrate so as to be substantially parallel to one another in a direction of travel of the electromagnetic waves, and a counter electrode formed on the other principal surface of the substrate, the counter electrode extending on a substantial entirety of the other principal surface or being separated into strips so as to be opposite to the plurality of strip-shaped electrodes formed on the one principal surface, wherein the electrostatic field is applied between the electrodes formed on the one principal surface and the counter electrode formed on the other principal surface to partially change a dielectric constant of the wave collector in a direction perpendicular to the direction of travel of the electromagnetic waves, whereby a direction of a beam of the electromagnetic waves radiated or absorbed through the input and output portions is made variable. Consequently, a beam scanning antenna having no mechanical driving portion inside and being small in size can be obtained, the reliability can be improved compared to the conventional case where the antenna itself is swung and the thickness can be reduced because it is unnecessary to secure a space for swinging the antenna, and the size as a radar can significantly be reduced compared to the conventional case where switching is made among a plurality of antennas. As a result, a lightweight, small-size, high-performance and low-cost beam scanning antenna optimum, for example, as a car radar can be provided.

As the material whose dielectric constant can be changed by the electrostatic field which material is used for the substrate of the wave collector in the beam scanning antenna of the invention, various kinds of materials may be used that are small in dielectric loss and whose dielectric constants are changed according to application of the electrostatic field in a frequency band such as microwaves or millimeter waves used in this antenna, specifically, a frequency band of approximately 3 to 80 GHz. As a characteristic of the material, since the beam scanning antenna is mounted on a car or the like, it is desirable that for application of a voltage of several tens of volts, the dielectric constant be changed by approximately 20% or more compared to a case where no electrostatic field is applied and that the dielectric loss be as small as not more than 1%.

Concrete examples of this material include ferroelectrics of $(Ba, Sr)TiO_3$, $BaTiO_3$, $SrTiO_3$ and the like, liquid crystal materials such as nematic liquid crystal, cholesteric liquid crystal and smectic liquid crystal sealed in a cell made of a dielectric being small in dielectric loss in a millimeter wave region such as glass, and liquid crystal polymers such as BL-036 manufactured by Merk & Co., Vectra and Xydar.

As the shape and dimensions of the substrate made of this material, a substrate shape of a size substantially the same as that of the antenna array, specifically, 30 to 50 mm×60 to 80 mm in the case of a vehicle-to-vehicle distance radar is used.

Moreover, the basic idea of the structure in which the wave collector is formed by using the substrate made of the material, disposing a plurality of strip-shaped electrodes substantially parallel to one another in the direction of travel of the electromagnetic waves on one principal surface, disposing the counter electrode formed on the other principal surface of the substrate which counter electrode extends on a substantial entirety of the other principal surface or is separated to be opposite to the strip-shaped electrodes formed on the one principal surface, and partially changing the internal dielectric constant by applying the electrostatic field between the electrodes formed on the one principal surface and the counter electrode formed on the other principal surface is, for example, as follows:

As a lens that converts electromagnetic waves between spherical waves and plane waves which lens has heretofore been used as a wave collector in a beam scanning antenna, one formed in a so-called lens shape in which the outside shape of a dielectric having a uniform dielectric characteristic is surrounded by a part of a curved surface have been used most frequently. Moreover, in some beam scanning antennas, a so-called rod lens has been used in which the compositions of the center and the periphery of the rod are continuously changed so that the refractive index for electromagnetic waves is highest at the center and decreases as a quadratic function with respect to the diameter toward the periphery. By setting the dielectric constant so as to be highest at the center of the flat substrate and to decrease so that the square root of the dielectric constant decreases as a quadratic function of the distance toward the periphery like in the rod lens, the refractive index for electromagnetic waves decreases as a quadratic function according to the distance, so that even a substrate being rectangular in outside shape can be caused to operate as a wave collector like the lens made of a material having a uniform dielectric characteristic.

Therefore, by using a substrate made of a material whose dielectric constant is changed according to the intensity of the applied electrostatic field and constructing an electrode structure such that a plurality of strip-shaped electrodes substantially parallel to one another in the direction of travel of the electromagnetic waves is disposed on both surfaces so as to be opposed to each other or that a plurality of strip-shaped electrodes substantially parallel to one another in the direction of travel of the electromagnetic waves is disposed on one surface and a counter electrode that becomes the ground plate is disposed on the entirety of the other surface so as to be opposed to the strip-shaped electrodes, the dielectric constant in the substrate of the wave collector can be distributed substantially in an arbitrary condition in the range of the dielectric characteristic of the material so that the direction of the beam of the electromagnetic waves can be moved between the primary radiator and the input and output portions.

Moreover, in the beam scanning antenna of the invention, by adjusting the external electric field (electrostatic field) applied between the strip-shaped electrodes and the counter electrode so that in the substrate of the wave collector, within the plane perpendicular to the direction of travel of the electromagnetic waves, the dielectric constant is substantially unchanged in the direction perpendicular to the shorter side of the strip-shaped electrodes on the one principal surface and in the direction parallel to the shorter side, the refractive index for the electromagnetic waves, that is, the square root of the dielectric constant is distributed as a quadratic function of the distance with the predetermined point as the peak, a flat rectangular substrate can be caused to function as a plano lens, so that the substrate can efficiently be caused to operate as a small-size wave collector.

To distribute the square root of the dielectric constant as a quadratic function as mentioned above, as the electrostatic field applied to the strip-shaped electrodes of the wave collector, for example, a desired voltage obtained from a relational expression of the change of the dielectric constant and the voltage of the electrostatic field with respect to the counter electrode is applied to the strip-shaped electrodes. For example, in the case of a material whose dielectric: constant decreases linearly with respect to the applied electric field, adjustment is made so that a voltage of 0 V is applied to the central strip-shaped electrode, that a maximum voltage determined by the electrostatic breakdown voltage of the dielectric or the capability of the control circuit is applied to the outermost strip-shaped electrodes, and that the voltages applied to the strip-shaped electrodes therebetween are proportionally distributed according to the biquadrate of the distance between the center of each strip-shaped electrode and the center of the wave collector.

Moreover, according to the beam scanning antenna of the invention, since in the wave collector, the distribution of the internal dielectric constant can be controlled by controlling the electrostatic field externally applied to the strip-shaped electrodes and the counter electrode by voltage control or the like, it is easy to parallelly shift the dielectric constant distribution in the wave collector rightward or leftward with the position of the substrate, that is, the position of the wave collector fixed by changing the externally applied electrostatic field, so that the position of the focal point of the wave collector with respect to the primary radiator can be moved easily. Consequently, the structure can be caused to operate as a beam scanning antenna by changing the beam direction.

The dimensions of the strip-shaped electrodes and the counter electrode to which electrodes such an electrostatic field is applied are set to be as small as possible so long as the processing method and the costs permit. Moreover, these electrodes are formed on the principal surfaces of the substrate by shaping electrodes of a metal such as copper or aluminum into a desired pattern configuration and dimensions by etching. It is to be noted that the electrodes may be formed by a lower-cost method such as the thick film method when the material permits.

Moreover, it is desirable in simplification of the structure that the two metal plates disposed parallel to each other which plates constitute the beam scanning antenna of the invention be made of copper or aluminum plates and disposed parallel to each other with a distance the same as the thickness of the primary radiator in between. These two metal plates are also used as members constituting the housing of the beams canning antenna.

Moreover, as the primary radiator transmitting and receiving electromagnetic waves, one is used that is capable of efficiently radiating an electromagnetic beam such as a wave guide with open ends or a dipole antenna. The primary radiator is situated in the position of the focal point of the wave collector and disposed between the two metal plates.

Further, as the input and output portions joining the electromagnetic waves between the wave collector and the input and output portions, slots or the like are used that are formed in a shape where the electromagnetic waves transmitted between the parallel plates are not reflected at the input and output portions. It is desirable that the input and output portions be disposed on one of the two metal plates in positions as close to the wave collector as possible.

According to the beam scanning antenna of the invention, the primary radiator transmitting and receiving electromagnetic waves and the flat wave collector for the electromagnetic waves are disposed between the two conductive plates, for example, metal plates disposed parallel to each other, and a plurality of input and output portions for joining the electromagnetic waves between the wave collector and the input and output portions is disposed on one of the metal plates; in the wave collector, a plurality of strip-shaped electrodes substantially parallel to one another in the direction of travel of the electromagnetic waves is disposed on one principal surface of the substrate made of the material whose dielectric constant can be changed by the electrostatic field, and on the other principal surface, the counter electrode is formed on the other principal surface of the substrate so as to extend on a substantial entirety of the surface or to be shaped like a strip and is disposed so as to be opposed to the strip-shaped electrodes on the one principal surface; and by applying the electrostatic field between the strip-shaped electrodes and the counter electrode to thereby partially change the dielectric constant of the wave collector in the direction perpendicular to the direction of travel of the electromagnetic waves, the direction of the beam of the electromagnetic waves radiated or absorbed through the input and output portions can be changed. Consequently, a beam scanning antenna having no mechanical driving portion inside and being small in size can be obtained, the reliability of the operation can be improved and the thickness can be reduced, so that the size as a radar can be reduced significantly. As a result, a lightweight, small-size, high-performance and low-cost beam scanning antenna optimum, for example, as a car radar can be provided.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
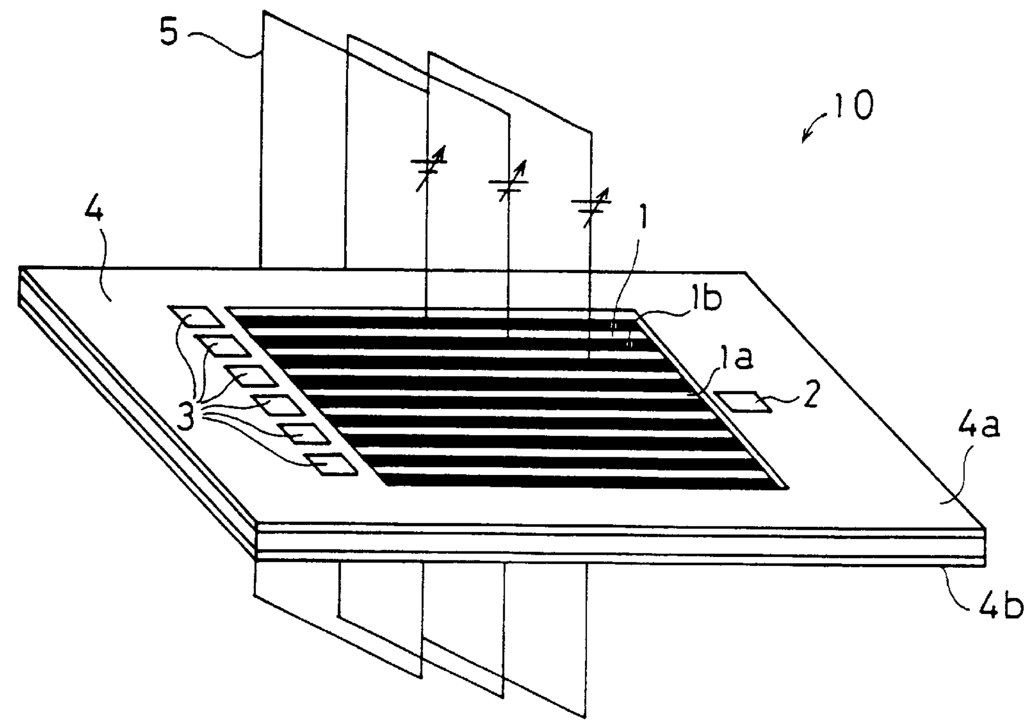
FIG. 1 is a perspective view showing, in a simplified form, the structure of a beam scanning antenna according to an embodiment of the invention.

Now referring to the drawings, preferred embodiments of the invention are described below.

FIG. 1 is a perspective view showing, in a simplified form, the structure of a beam scanning antenna 10 according to an embodiment of the invention. The beam scanning antenna 10 includes a wave collector 1, a slot 2, slots 3 and a housing 4. In the wave collector 1, a plurality of strip-shaped electrodes 1*b* is arranged substantially parallel to one another in the direction of travel of electromagnetic waves on one principal surface, the top surface in this embodiment, of a substrate 1*a*. The slot 2 is formed in one of two metal plates 4*a* and 4*b* (in the upper metal plate 4*a* in this embodiment) which are conductive and disposed parallel to each other and constitute the housing 4, and functions as a primary radiator. The slots 3 are formed in one of the two metal plates 4*a* and 4*b* disposed parallel to each other, in the upper metal plate 4*a* in this embodiment, and function as a plurality of input and output portions. The housing 4 comprises the two metal plates 4*a* and 4*b* disposed parallel to each other, and functions as the housing of the beam scanning antenna 10. An electrostatic field 5 applied to the electrodes of the wave collector 1 is also shown in FIG. 1. This embodiment will be described mainly with respect to a case where electromagnetic waves are inputted through the slot 2.

First, the electromagnetic waves inputted through the slot 2 are converted to plane waves by a waveguide or the like (not shown) while propagating through the substrate 1*a* of the wave collector 1, and are radiated to outside from the slots 3 coupled to the wave collector 1. At this time, the intensity and distribution of the electrostatic field 5 applied to the wave collector 1 is adjusted by a voltage applied to the strip-shaped electrodes, so that with the position of the slot 2 functioning as a primary radiator as the peak, the square root of the dielectric constant in the substrate of the wave collector 1 is distributed as a quadratic function of the distance from the peak. By doing this, the phases of the electromagnetic waves radiated from the slots 3 functioning as the input and output portions become the same, so that a beam of the electromagnetic waves is radiated in a direction frontward from the slots 3. When the quadratic-functional distribution is shifted from the position of the slot 2 by adjusting the intensity and distribution of the electrostatic field 5 so as to parallelly shift rightward or leftward compared to the case of the above-described condition, the phase differences between the electromagnetic waves radiated through the adjoining slots 3 become the same according to the amount of the position shift. Consequently, the beam comprising a composition of these electromagnetic waves is inclined at an angle corresponding to the phase difference from the direction frontward from the slots 3.

While in the example shown in FIG. 1, the slot 2 as a primary radiator which is an input portion and the slots 3 which are output portions are provided on, of the two metal plates 4*a* and 4*b* disposed parallel to each other, the same metal plate 4*a*, in normal beam scanning antennas, the input and the output portions are frequently provided on different metal plates in view of effective use of the space.

When the slots 3 as the output portions function as an antenna by themselves, a sufficient function as a beam scanning antenna is obtained only with the structure shown in FIG. 1. Further, by connecting antenna elements or antenna arrays to the slots 3, an arbitrary beam configuration or antenna gain can be obtained. Further, by connecting planar antenna elements or planar antenna arrays to the slots 3, an arbitrary beam configuration or antenna gain can be obtained and a beam scanning antenna being thin as a whole can be structured.

Figure 2:
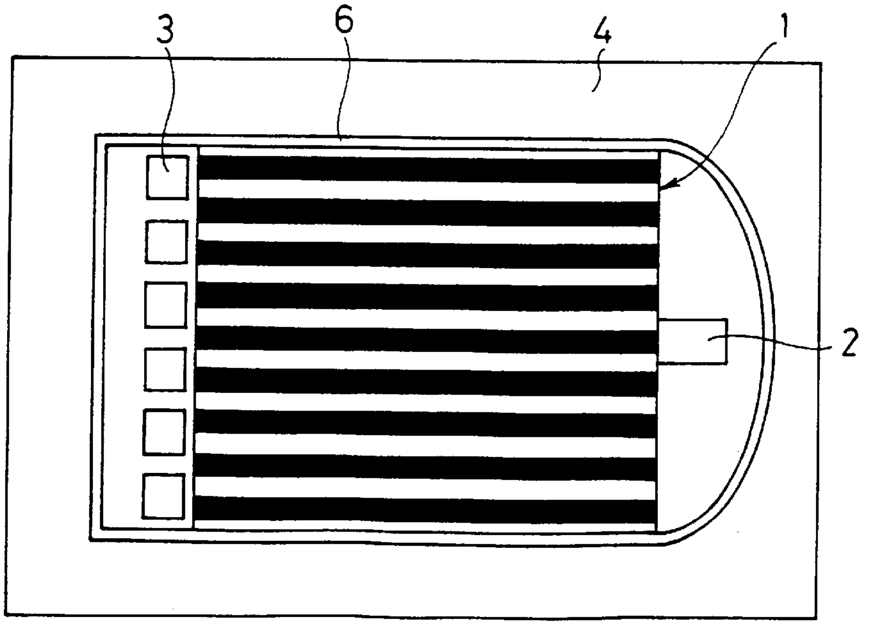
FIG. 2 is a plan view showing the internal structure of the beam scanning antenna of the invention.

FIG. 2 is a plan view showing the internal structure of the beam scanning antenna 10 of the invention. In FIG. 2, of the two metal plates 4*a* and 4*b* shown in FIG. 1, the metal plate 4*b* where the slot 2 and the slots 3 are not formed is not shown. It is preferable to provide a metal frame 6 so as to surround the wave collector 1, the slot 2 and the slots 3 as shown in FIG. 2. By providing the metal frame 6, the electromagnetic waves unnecessarily radiated to outside can be reduced, so that the antenna efficiency can be improved. The metal frame 6 is made by use of a metal excellent in conductivity and processability such as copper, aluminum or iron, and is disposed so as to be as close to the sides of the wave collector 1 as possible. With respect to the positional relationship between the metal frame 6 and the primary radiator, in order that the electromagnetic waves unnecessarily radiated backward are efficiently radiated frontward, for example, the metal frame 6 is formed in a parabolic shape and the primary radiator is disposed at the focal point of the parabola. With respect to the positional relationship between the metal frame 6 and the input and output portions, the metal frame 6 and the input and output portions are disposed so that the electromagnetic waves are most efficiently radiated at the input and output portions. The metal frame 6 and the metal plates 4*a* and 4*b* are joined by metal joining such as soldering.

Figure 3A:
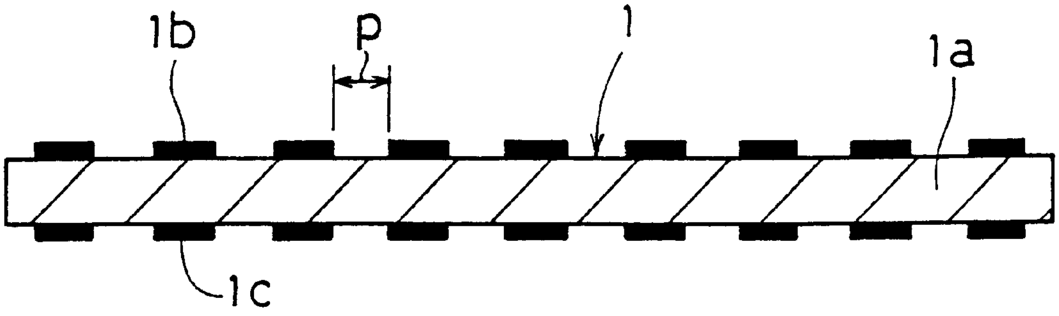
FIG. 3A is a cross-sectional view showing an example of a wave collector used in the beam scanning antenna of the invention.

FIG. 3A is a cross-sectional view, in a direction perpendicular to the direction of travel of electromagnetic waves, showing an example of the wave collector 1 used in the beam scanning antenna 10 of the invention. In the example shown in FIG. 3A, a plurality of strip-shaped electrodes 1*b* and a plurality of strip-shaped electrodes 1*c* having the same shape are disposed on both principal surfaces of the substrate 1*a* so as to be opposed to each other. When the strip-shaped electrodes 1*b* and the strip-shaped counter electrodes 1*c* are disposed so as to be opposite to each other as mentioned above, it is easy to control the electrostatic field.

Figure 3B:
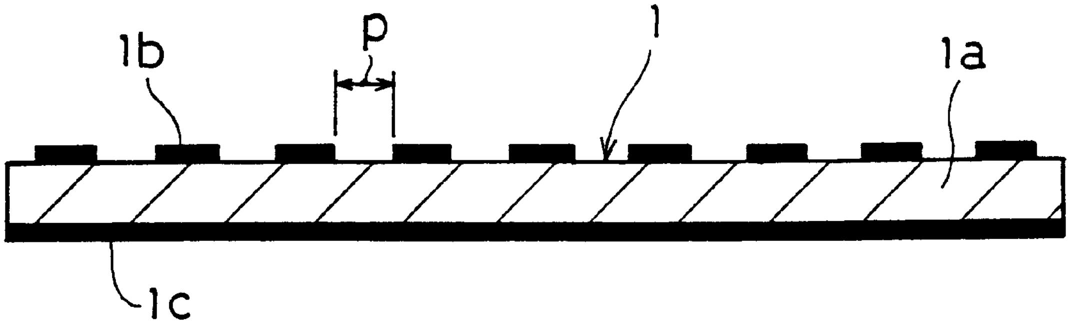
FIG. 3B is a cross-sectional view showing another example of the wave collector used in the beam scanning antenna of the invention.

FIG. 3B is a cross-sectional view, in a direction perpendicular to the direction of travel of electromagnetic waves, showing another example of the wave collector 1 used in the beam scanning antenna 10 of the invention. When the counter electrode 1*c* is formed on a substantial entirety of the surface of the substrate 1*a* so as to be opposed to the electrodes 1*b* as shown in FIG. 3B, wiring can be simplified.

Next, a concrete example of the beam scanning antenna 10 of the invention will be described.

The wave collector 11 in the beam scanning antenna 10 of the invention was manufactured in the following manner: First, on the metal plate 4*a* of 30 mm in width and 50 mm in length, made of copper, the substrate 1*a* of 25 mm in length and 30 mm in width, made of a material whose dielectric constant was changed in a range of 2 to 4 by application of an electrostatic field was placed in a position of 5 mm from an end surface of the metal plate 4*a* on the side in the direction of the length which was the direction of travel of electromagnetic waves. Then, on one principal surface of the substrate 1*a*, the strip-shaped electrodes 1*b* of 1 mm in width and 25 mm in length, extending in the direction of the length were formed at intervals p of 1 mm in the direction of the width, and on the other principal surface, the counter electrode 1*c* was formed on a substantial entirety of the other principal surface so as to be opposed to the electrodes 1*b*. Then, the counter electrode 1*c* and the metal plate 4*b* were joined together so that the counter electrode 1*c* was the ground plane. The wave collector 1 was manufactured in this manner. The primary radiator 2 was provided so as to be in close contact at the center of the side of 30 mm of the wave collector 1.

Then, the direct-current voltage applied between the strip-shaped electrodes 1*b* and the counter electrode 1*c* (ground plane) was adjusted to the following condition: The electrostatic field was set so that the dielectric constant was 4 at the center of the side of 30 mm of the wave collector 1 and 2 at an end, that the square root of the dielectric constant decreased in proportion to the square of the distance from the center between the center of the side to the end and that the dielectric constant distribution was uniform in the direction of the length of the substrate 1*a* (corresponding to the direction of travel of electromagnetic waves) A simulation of the electromagnetic field distribution was performed on the wave collector 1 thus set by use of the FDTD (finite difference time domain) method.

At this time, an input signal of 10 GHz was generated at an end in the center in the direction of the length of the substrate 1*a* constituting the wave collector 1, and the phases of the microwave signals inputted through the primary radiator 2 in the center in the direction of the thickness of the substrate 1*a* constituting the wave collector 1 were examined. In doing this, the electric field distribution of a microwave signal input at an instant on a plane in the center in the direction of thickness of the wave collector 1 was examined in steps of 2 mm with the direction from the center of the wave collector 1 to the right of the wave collector 1 as the plus direction. The result is shown in FIG. 4 as a graph.

Figure 4:
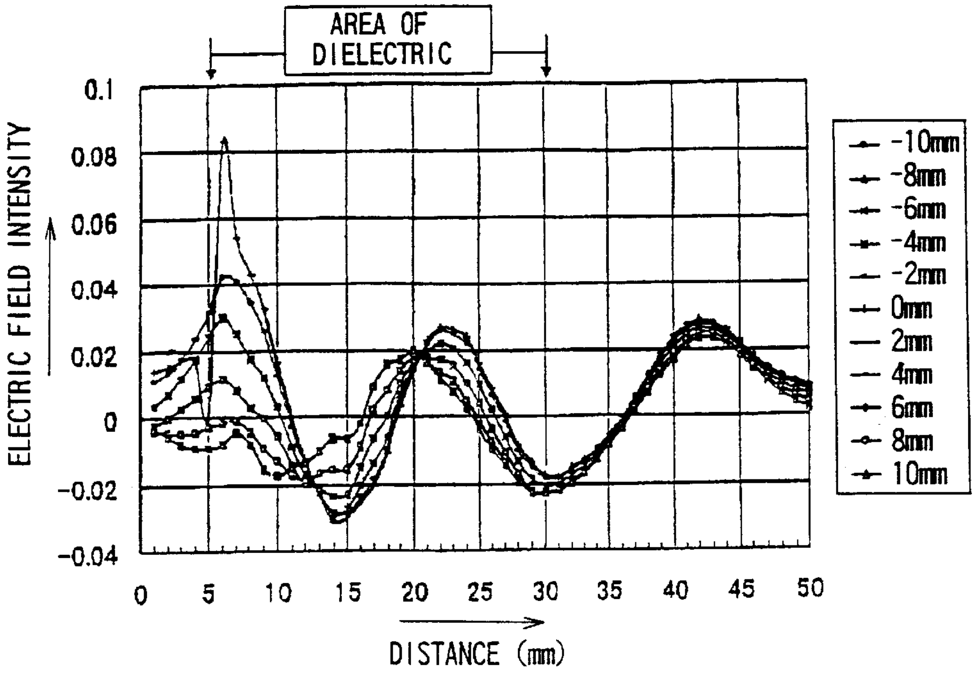
FIG. 4 is a graph showing the result of an evaluation of a characteristic that spherical waves can be converted to plane waves in the embodiment of the beam scanning antenna of the invention.

In FIG. 4, the axis of abscissas represents the distance from ends of the metal plates 4*a* and 4*b* (unit: mm), the axis of ordinates represents the electric field intensity at the center in the direction of the thickness of the wave collector 1 (unit: standardized by the maximum value of the electric field radiated from the primary radiator 2), and each characteristic curve represents the electric field intensity at each position. The area of the distances 5 to 30 mm on the axis of abscissas represents positions where the dielectric substrate 1*a* used as the wave collector is present.

As shown in FIG. 4, under this condition, the phases of the microwave signals are all the same at the side of the wave collector 1 opposite when viewed from the side of the primary radiator 2, and the same effect as that produced when the primary radiator is disposed a tone focal point of a plano lens is produced. Thus, it is apparent that the wave collector 1 functions as a lens for electromagnetic waves.

Next, a simulation similar to the above-described one was performed also by the FDTD method with the condition set as follows: The direct-current voltage applied to the electrodes 1*b* and 1*c* on the substrate 1*a* of the wave collector 1 was parallelly shifted with the positional relationship between the wave collector 1 and the primary radiator 2 fixed, the position where the dielectric constant was 4 was shifted 4 mm leftward from the center of the wave collector 1 in the direction of the width of the wave collector 1, and the dielectric constant distribution was also parallelly shifted 4 mm leftward. In this case, the electric field distribution of a microwave signal input at an instant on a plane in the center in the direction of thickness of the wave collector 1 was also examined in steps of 2 mm with the direction from the center of the wave collector 1 to the right of the wave collector 1 as the plus direction. The result is shown in FIG. 5 as a graph like that in FIG. 4.

Figure 5:
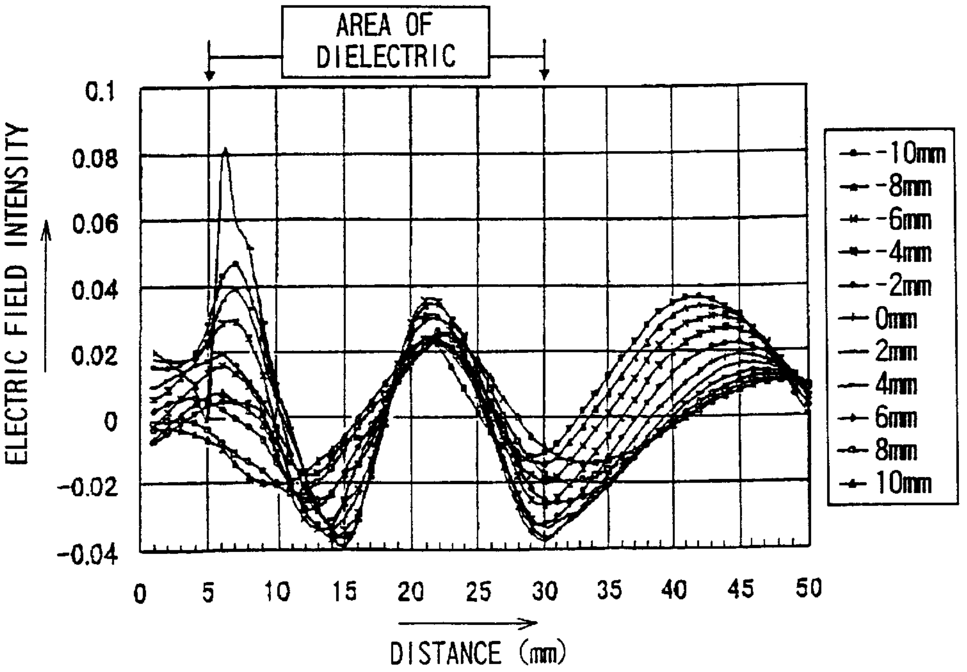
FIG. 5 is a graph showing the result of an evaluation of a characteristic that the phase of the converted plane waves can be changed according to the position in the embodiment of the beam scanning antenna of the invention.

As is apparent from the result shown in FIG. 5, the position where the phase of the microwave signal is 0 in the space opposite to the primary radiator 2 of the wave collector 1 under this condition is 37 mm on the extension line at the center of the wave collector 1. The phase advances on a straight line 10 mm apart leftward from the center of the wave collector 1 (line of −10 mm); the point where the phase is 0 is 33.5 mm. Conversely, the phase lags on a straight line 10 mm apart rightward (line of +10 mm); the point where the phase is 0 is 41.5 mm. At the positions therebetween, the point where the phase is 0 also differs according to the distance from the center. In this range, the phase linearly changes according to the distance from the center, and in a range of ±10 mm, the phase linearly changes by 120 degrees.

The relationship between the inclination of the principal beam of uniformly spaced linear antenna arrays and the phase difference between adjoining antenna elements is generally expressed by $$\phi=(2\pi d/\lambda)\sin\theta s$$

where $\phi$ is the phase difference between adjoining elements, d is the antenna element pitch, $\lambda$ is the wavelength of the electromagnetic wave in the space, and θs is the inclination of the principal beam.

In the above-described simulations, when it is assumed that the input and output portions 3 are disposed in close proximity of the wave collector 1, that each of the input and output portions 3 is connected to one antenna element and that the pitch between the antenna elements is 4 mm, since the wave length in the space is 30 mm and there is a phase difference of 120 degrees in a range of 20 mm in this embodiment, θs is 30 degrees. As is apparent from this, since the phases of the electromagnetic waves radiated through the input and output portions 3 disposed in the proximity of the wave collector 1 linearly change according to the position, it is apparent that the beam comprising a combination of the electromagnetic waves is inclined.

Moreover, it is apparent that the phase change amount is determined by the dielectric constant distribution of the wave collector 1. That is, the phase change amount is determined by the position of the peak of the distribution of the electrostatic field applied to the strip-shaped electrodes 1*b* of the wave collector 1. Therefore, by changing the electrostatic field distribution, an arbitrary phase change can be made in a range corresponding to the distribution that can be taken within the range of rate of change of the dielectric constant determined by the material of the wave collector.

Consequently, it is apparent that according to the beam scanning antenna 10 of the invention, the beam of the electromagnetic waves transmitted or received through the input and output portions 3 can be inclined according to the change of the electrostatic field applied to the wave collector 1. Therefore, the beam of the electromagnetic waves can be caused to scan by changing the electrostatic field, for example, periodically.

Moreover, as the minimum scanning angle which is determined by the material of the wave collector 1 and the distribution of the electrostatic field applied to the wave collector 1, an arbitrary angle can be selected. The maximum scanning angle is also determined by the material of the wave collector 1 and the distribution of the applied electrostatic field, and particularly, the maximum value is determined by the material of the wave collector 1. That is, the higher the ratio between the dielectric constant in a condition where no electric field is applied and the dielectric constant in a condition where the change of the dielectric constant is saturated even if the electric field is further applied, the larger the scanning angle can be. Therefore, it is easy to cause the beam of the electromagnetic waves to scan at a practically sufficient scanning angle.

From the above, it has been confirmed that the beam scanning antenna 10 of the invention has an excellent beam scanning property and capable of operating only by an electric signal control which is application of an electrostatic field to the wave collector 1 without the need for a mechanical driving portion.

The above-described is merely an example of embodiments of the invention. The invention is not limited thereto, and various changes and improvements may be made without departing from the spirit and scope of the invention. For example, as the two conductive plates disposed parallel to each other, ceramic substrates having substantially the entire areas of their back surfaces metalized may be used, or resin circuit boards having a back surface which is nearly entirely covered with copper foil patterns may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A beam scanning antenna comprising:

two conductor plates disposed parallel to each other;

a primary radiator for transmitting and receiving electromagnetic waves; and a wave collector for electromagnetic waves, shaped like a flat plate, the primary radiator and the wave collector being disposed between the two conductive plates, a plurality of input and output portions for coupling the electromagnetic waves to the wave collector, and the input and output portions being disposed on one of the conductive plates, the wave collector including a substrate formed of a material whose dielectric constant can be changed by an electrostatic field, a plurality of strip-shaped electrodes disposed on one principal surface of the substrate so as to be substantially parallel to one another in a direction of travel of the electromagnetic waves, and a counter electrode formed on the other principal surface of the substrate, the counter electrode extending on a substantial entirety of the other principal surface or being separated into strips so as to be opposite to the plurality of strip-shaped electrodes formed on the one principal surface, wherein the electrostatic field is applied between the electrodes formed on the one principal surface and the counter electrode formed on the other principal surface to partially change a dielectric constant of the wave collector in a direction perpendicular to the direction of travel of the electromagnetic waves, whereby a direction of a beam of the electromagnetic waves radiated or absorbed through the input and output portions is made variable.

2. The beam scanning antenna of claim 1, wherein within a plane perpendicular to the direction of travel of the electromagnetic waves in the substrate of the wave collector, the wave collector has a dielectric constant substantially unchanged in a direction perpendicular to a shorter side of the strip-shaped electrodes formed on the one principal surface, and has in a direction parallel to the shorter side, refractive indices for the electromagnetic waves which are distributed as a quadratic function of distance with a predetermined point as a peak.

3. The beam scanning antenna of claim 2, wherein within a plane perpendicular to the direction of travel of the electromagnetic waves in the substrate of the wave collector, the wave collector has a highest dielectric constant at a center of the substrate in the direction parallel to a shorter side of the strip-shaped electrodes formed on the one principal surface and has dielectric constants which are reduced so that square roots of the dielectric constants decrease as a quadratic function of distance toward a periphery of the substrate, whereby the refractive indices for the electromagnetic waves are decreased as the quadratic function of distance with the center of the substrate as a peak.

4. The beam scanning antenna of claim 1, wherein the dielectric constant of the material of the substrate whose dielectric constant can be changed by the electrostatic field is changed by 20% or more by application of the electrostatic field, and a dielectric loss thereof is 1% or less.

5. The beam scanning antenna of claim 4, wherein the material of the substrate is made of a ferroelectric of (Ba, Sr)$TiO_3$, $BaTiO_3$ or $SrTiO_3$, or a liquid crystal material such as nematic liquid crystal, cholesteric liquid crystal or smectic liquid crystal, or a liquid crystal polymer.

6. A wave collector comprising:

a substrate made of a material whose dielectric constant can be changed by an electrostatic field, in which substrate electromagnetic waves travel in a predetermined direction of travel;

strip-shaped electrodes disposed on one principal surface of the substrate so as to be substantially parallel to one another in the direction of travel of the electromagnetic waves; and a counter electrode formed on the other principal surface of the substrate, the counter electrode extending on a substantial entirety of the other principal surface or being separated into strips so as to be opposite to the plurality of strip-shaped electrodes formed on the one principal surface, wherein a dielectric constant of the wave collector in a direction perpendicular to the direction of travel is partially changed by applying an electrostatic field between the electrodes formed on the one principal surface and the counter electrode formed on the other principal surface.

7. The wave collector of claim 6, wherein within a plane perpendicular to the direction of travel of the electromagnetic waves in the substrate of the wave collector, the wave collector has a dielectric constant substantially unchanged in a direction perpendicular to a shorter side of the strip-shaped electrodes formed on the one principal surface, and has in a direction parallel to the shorter side, refractive indices for the electromagnetic waves which are distributed as a quadratic function of distance with a predetermined point as a peak.

8. The wave collector of claim 7, wherein within a plane perpendicular to the direction of travel of the electromagnetic waves in the substrate of the wave collector, the wave collector has a highest dielectric constant at a center of the substrate in the direction parallel to a shorter side of the strip-shaped electrodes formed on the one principal surface and has dielectric constants which are reduced so that square roots of the dielectric constants decrease as a quadratic function of distance toward a periphery of the substrate, whereby the refractive indices for the electromagnetic waves are decreased as the quadratic function of distance with the center of the substrate as a peak.

9. The wave collector of claim 6, wherein the dielectric constant of the material of the substrate whose dielectric constant can be changed by the electrostatic field is changed by 20% or more by application of the electrostatic field, and a dielectric loss thereof is 1% or less.

10. The wave collector of claim 9, wherein the material of the substrate is made of a ferroelectric of (Ba, Sr)$TiO_3$, $BaTiO_3$ or $SrTiO_3$, or a liquid crystal material such as nematic liquid crystal, cholesteric liquid crystal or smectic liquid crystal, or a liquid crystal polymer.

* * * * *